United States Patent Office 3,726,835
Patented Apr. 10, 1973

3,726,835
POLYURETHANE PREPOLYMERS CURED WITH MELAMINE OR DICYANDIAMIDE
Eugene R. Bertozzi, Yardley, Pa., assignor to Thiokol Chemical Corporation, Bristol, Pa.
No Drawing. Filed Jan. 12, 1971, Ser. No. 105,990
Int. Cl. C08g 22/16, 22/08
U.S. Cl. 260—75 NH                8 Claims

ABSTRACT OF THE DISCLOSURE

A storage-stable polyurethane prepolymer has been prepared in which the stabilizer is melamine or dicyandiamide admixed thereto; upon heating of the melamine admixed prepolymer, the composition is cured to a very tough polymer in a short time having a hardness of 70 Durometer A value forming a variety of cast shapes.

---

This invention relates to storage-stable prepolymer compositions, more particularly this invention relates to a prepolymer composition which can readily be converted into a very tough polymer having excellent properties.

In the field of urethane prepolymer formulations, a number of prepolymers have been employed as starting materials for obtaining a precursor for forming a polyurethane polymer having properties suitable for employment in application such as high abrasion resistance elastomers. However, it has been found that a polyurethane prepolymer often has a tendency to polymerize by condensation or gel formation which renders the further polymerization of these materials subject to variation in properties and thus prevent the precise control needed for obtaining a uniform polymer product. It has been known also that the polyurethane prepolymers may be rendered storage stable by various means; however, these storage-stable characteristics have been imparted by agents which do not participate in the subsequent use of the material, participate with results which are less than desired or satisfactory, or require added components in a prepolymer system.

In order to prevent the condensation or gel formation, it has been a practice to block the reactive sites of prepolymers by reacting the same with blocking agents such as an imene, oxime, or ketoxime. These prepolymers then have a longer shelf life and can be admixed with curing agents. Nevertheless, while the stability of these blocked prepolymer compositions is acceptable, these prepolymers are prepared in a solution form and/or form which allows the conversion of a blocked group to an unblocked group and the removal of the blocking agent from the prepolymer. Often these blocked prepolymers are admixed with the curing agent, but the shelf life of these polymers has dictated the use of two component systems.

Hence, it has been a desideratum in the polyurethane elastomer molding or casting art to employ a one-component system without using a blocked prepolymer and without using any solvents in the system. As it can be readily appreciated, the casting of polyurethane elastomer shapes requiring solvent removal is indeed very undesirable and can be practiced only under very limited circumstances.

It has now been found that if melamine or dicyandiamide is added to a polyurethane prepolymer, in an amount of 100 parts to 1,000 parts of prepolymer, the admixture is storage stable for at least two months at a room temperature without curing, but if heated to a temperature of about 300° F., the composition cures very rapidly, i.e. about 10 to 15 minutes, to produce a very tough polymer having a hardness of about 70 Durometer (Value A).

The unexpected discovery has thus allowed the ready field use or employment of a one-package polyurethane polymer to obtain polymer shapes, the properties of which have been heretofore sought to be obtained by other means or by two-component precursor combinations.

In reference to the precursors which may be employed as a prepolymer, these consist of polyester, polyether, polyester or —OH group terminated polyols from which the prepolymer is prepared by reacting the same with an appropriate diisocyanate.

As polyols, the polyester polyols are most commonly employed and these consist of a reaction product of polypropylene oxide, polytetramethylene glycol and adipic acid. Similar esters are also prepared from ethylene glycol, propylene glycol and adipic acid. Other ester polyols are prepared from castor oil. Because of the widespread use of these polyols, the chemistry of the ester polyols is well known, and literature is replete with thorough discussion of these polyols. For example, U.S. Pat. 3,264,236 discloses other polyester polyols.

As polyether polyols, the polyethylene glycol based polyether or the polypropylene glycol polyethers are preeminent. Other polyether polyols also within the scope of this invention are the various mixtures of the two basic ether components, i.e. the ethylene and propylene oxide or glycol-derived polyethers with various admixtures of other components as it is well known in the art.

A further polyol and prepolymer useful for the present purpose is disclosed in U.S. Pat. 3,386,963 by Santaniello and incorporated herein by reference. Briefly, this polyurethane prepolymer is a hydroxy-group containing polysulfide polymer which is reacted with a polyisocyanate such that the ratio of isocyanate groups to hydroxyl groups is between 1 and 4.

Another suitable group of polyols are the poly B-D® group of polyols which are liquid hydroxy group terminated polybutadiene homo- and copolymers and available from Sinclair Oil Company. These are known in the trade as poly B-D, R-15M, and R-45M, which are the homopolymers of 200 poise and 50 poise viscosity, respectively. Copolymers which are liquid and are based on the hydroxy terminated polybutadiene resins and also available from the same source are the poly B-D CS-15 butadiene-styrene copolymers of about 75 weight percent butadiene and 25 weight percent styrene in the resins, and having a viscosity of about 25 poises, and the hydroxyterminated butadiene-acrylonitrile copolymers of about 85% by weight of butadiene and 15% by weight of acrylonitrile in the polymer and having a viscosity of about 500 poise.

A wide variety of polyisocyanates can suitably be reacted with the above-described hydroxyl-containing polymers to prepare the isocyanate-terminated polysulfide polymers of the invention. Generally, any of the organic polyisocyanates that have previously been proposed for the preparation of polyurethane resins may be employed in preparing the present products. Suitable polyisocyanates are, for example, arylene polyisocyanates such as tolylene, metaphenylene, 4-chlorophenylene-1,3-, methylene-bis-(phenylene-4-), biphenylene-4,4'-, 3,3'-dimethoxy-biphenylene-4,4'-, 3,3'-diphenyl-biphenylene-4,4'-, naphthalene-1,5- and tetrahydronaphthalene-1,5-diisocyanates and triphenylmethane triisocyanate; alkylene polyisocyanates such as ethylene, ethylidene, propylene-1,2-, butylene-1,4-, butylene-1,3-, hexylene-1,6-, decamethylene-1,10-, cyclohexylene-1,2-, cyclohexylene-1,4-, and methylene-bis-(cyclohexyl-4,4'-)-diisocyanates. Toluene diisocyanates, commercially the most widely used diisocyanates, are preferred, especially a mixture of 80% of the 2,4-isomer and 20% of the 2,6-isomer thereof. Inorganic polyisocyanates are also suitable according to the invention.

The above-described prepolymer then can readily be reacted by heating it in the presence of melamine or dicyandiamide. In distinction from melamine, dicyandiamide imparts to the final product a yellow color of uniform shade.

As mentioned before, the storage stability of the prepolymer to which has been admixed the curing agent is excellent. Hence, the one-package urethane casting compound which cures at a very fast rate at the indicated temperature offers a number of desired properties for elastomer casting at a high rate and at a temperature such as indicated before. The physical properties of the polyurethane, of course, depends on the prepolymer, but the herein disclosed prepolymers show excellent curing behavior at the indicated temperature producing a very tough polymer having a hardness far superior to the hardness normally encountered.

The following example has been included to illustrate the present invention:

EXAMPLE 100 grams of prepolymer of polypropylene oxide/polytetramethylene glycol/adipic acid and toluene diisocyanate (of the above-described isomeric composition) were admixed with 10 grams of melamine powder. This mixture is stable for a month at room temperature and displays no evidence of curing. When this mixture was heated at 300° F., it cured to a very tough polymer in 10 to 15 minutes with a hardness of 70 Durometer value (A). When dicyandiamide was substituted for melamine, a similar result was obtained; however, whereas the melamine-containing polymer is white or colorless, the dicyandiamide-containing polymer has a yellow color. Various shapes of the polymer as cast are thus obtained.

In order to provide improved workability as necessitated by the workability requirements, various agents may be added to the above-described composition, such as thickening agents, diluents, fillers, compounds imparting thixotropic properties, etc. Suitable fillers are cement, e.g., portland cement and other cements known in the art, carbon black, calcium hydroxide, calcium carbonate, calcium sulfate, powdered cork, wood flour, talc clays, silica and titanium dioxide. A suitable thixotropic agent is Attagel 20, a hydrated magnesium aluminum silicate.

As can be seen from the above, the disclosed one-package curable polyurethane casting compounds offer a very convenient composition for obtaining resins at high production rates which form a tough, abrasion-resistant polymer.

What is claimed is:

1. As a composition of matter a heat-curable, storage-stable polyurethane casting composition consisting essentially of an isocyanate-terminated polyester, polyether, polysulfide, or polybutadiene polyol prepolymer in admixture with a curative consisting of melamine or dicyandiamide in a weight ratio of prepolymer to melamine, dicyandiamide or mixture of melamine and dicyandiamide of 100:2 to 25.

2. As a composition of matter a heat-curable polyurethane prepolymer as defined in claim 1 wherein the curative is melamine.

3. As a composition of matter a heat-curable polyurethane prepolymer as defined in claim 1 wherein the curative is dicyandiamide.

4. In a method for producing tough, abrasion-resistant polyurethane polymers the improvement which consists essentially of admixing 100 parts by weight of an isocyanate terminated polyol prepolymer with 2 to 25 parts by weight of melamine, dicyandiamide, or mixtures thereof, heating said admixture at a temperature of 250° F. to 350° F. for 5 to 25 minutes, whereby the melamine or dicyandiamide acts as a curative for said prepolymer, casting said polyurethane polymer and recovering the cast polyurethane polymer.

5. As a composition of matter a cured polyurethane polymer prepared by the process of claim 3.

6. The method as defined in claim 4 and wherein melamine is admixed with said polymer.

7. The method as defined in claim 4 and wherein dicyandiamide is admixed with said prepolymer.

8. A cast polyurethane polymer shape prepared by the process as defined in claim 4.

References Cited

UNITED STATES PATENTS

| | | | |
|---|---|---|---|
| 2,894,919 | 7/1959 | Simon et al. | 260—2.5 |
| 2,929,794 | 3/1960 | Simon et al. | 260—45.4 |
| 3,440,273 | 4/1969 | Bertozzi | 260—471 |
| 3,087,912 | 4/1963 | Wagner et al. | 260—67 |
| 3,245,961 | 4/1966 | Fetscher et al. | 260—77.5 |

FOREIGN PATENTS 6504562  10/1965  Netherlands ___ 260—75 NH X

DONALD E. CZAJA, Primary Examiner
H. S. COCKERAM, Assistant Examiner

U.S. Cl. X.R.

260—77.5 AP, 77.5 SS